(12) United States Patent
Acker et al.

(10) Patent No.: US 6,874,839 B2
(45) Date of Patent: Apr. 5, 2005

(54) VEHICLE ENDGATE WITH INTEGRAL DOOR

(75) Inventors: John R. Acker, Farmington Hills, MI (US); Henry J. Nykiel, Howell, MI (US); Clayton E. Miner, Leslie, MI (US); Marvin Plotzka, Howell, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/383,486

(22) Filed: Mar. 7, 2003

(65) Prior Publication Data

US 2004/0174035 A1 Sep. 9, 2004

(51) Int. Cl.[7] ............................................. B62D 25/08
(52) U.S. Cl. ........................................ 296/57.1; 296/51
(58) Field of Search .......................... 296/57.1, 50, 51, 296/61, 146.1, 147, 146.8, 146.11

(56) References Cited

U.S. PATENT DOCUMENTS

| | | | | |
|---|---|---|---|---|
| 602,138 | A | * | 4/1898 | Metcalfe ........................ 296/51 |
| 666,186 | A | | 1/1901 | DeLong et al. |
| 1,331,570 | A | * | 2/1920 | Knutson ........................ 296/51 |
| 2,045,489 | A | | 6/1936 | Payette ........................ 296/51 |
| 2,374,697 | A | | 5/1945 | Palisano et al. .............. 296/50 |
| 3,612,601 | A | * | 10/1971 | Himka et al. .................. 296/51 |
| 4,335,916 | A | * | 6/1982 | Gutgsell .................. 296/100.1 |
| 4,620,743 | A | * | 11/1986 | Eke .......................... 296/146.8 |
| 5,029,927 | A | | 7/1991 | Totani ........................... 296/50 |
| 5,170,746 | A | * | 12/1992 | Roose ......................... 119/512 |
| 5,205,603 | A | | 4/1993 | Burdette, Jr. ................. 296/62 |
| 5,265,450 | A | * | 11/1993 | Doyle .......................... 70/118 |
| 5,295,374 | A | * | 3/1994 | Bender et al. ................. 70/208 |
| 5,451,089 | A | * | 9/1995 | Bender ....................... 296/57.1 |
| 5,468,038 | A | | 11/1995 | Sauri ......................... 296/57.1 |
| 5,533,774 | A | | 7/1996 | Cavanaugh .................. 296/66 |
| 5,685,594 | A | * | 11/1997 | Harper ........................ 296/51 |
| D399,468 | S | | 10/1998 | Lund et al. ................. D12/196 |
| 5,876,086 | A | | 3/1999 | Lagrou et al. ......... 296/146.11 |
| 5,882,053 | A | * | 3/1999 | Bekins et al. ............. 292/336.3 |
| 6,174,016 | B1 | * | 1/2001 | Ponziani ...................... 296/56 |
| 6,227,594 | B1 | | 5/2001 | Pommeret .................. 296/57.1 |
| 6,357,813 | B1 | * | 3/2002 | Vandeberghe et al. ..... 296/57.1 |
| 6,364,391 | B1 | | 4/2002 | Everett ........................ 296/51 |
| 6,398,288 | B1 | * | 6/2002 | Yuge ....................... 296/146.4 |
| 6,502,885 | B1 | * | 1/2003 | Gammon et al. ......... 296/37.13 |
| 6,607,231 | B2 | * | 8/2003 | Paiva et al. .................. 296/56 |
| 6,607,232 | B2 | * | 8/2003 | Katulka .................... 296/57.1 |
| 2002/0167188 | A1 | * | 11/2002 | Zagaroff .................... 296/57.1 |
| 2003/0015885 | A1 | * | 1/2003 | Landwehr ................... 296/61 |
| 2003/0122396 | A1 | * | 7/2003 | Humphrey et al. ........... 296/51 |

* cited by examiner

*Primary Examiner*—D. Glenn Dayoan
*Assistant Examiner*—H. Gutman
(74) *Attorney, Agent, or Firm*—Laura C. Hargitt

(57) ABSTRACT

A vehicle includes a cargo bed having a floor, side walls and a rear end opening with an endgate pivotally connected at the rear end opening. The endgate is pivotable between a vertical position covering the rear end opening and a horizontal position exposing the rear end opening for cargo loading and unloading. The endgate has a pass-through opening formed therein and includes a door integrally contained within the endgate. The door is pivotable with respect to the endgate between a closed position covering the pass-through opening and an open position to allow loading and unloading of cargo through the pass-through opening when the endgate is in the vertical position.

19 Claims, 5 Drawing Sheets

US 6,874,839 B2

VEHICLE ENDGATE WITH INTEGRAL DOOR

TECHNICAL FIELD

The invention relates to a vehicle endgate having an integral door or mini-gate to improve access to the vehicle cargo bed.

BACKGROUND OF THE INVENTION

Most trucks include a rear cargo box with a floor called a bed. The cargo box is closed off at its rear end by an endgate or tailgate. The endgate is typically hinged at its bottom to the truck along a horizontal axis. In its upright position, it closes off the cargo box. In its lowered position, the endgate allows for loading and unloading of cargo into and out of the cargo box.

The prior art includes numerous tailgate assemblies of varying configurations to provide different functionality. Certain modern vehicle designs, such as General Motors trucks the GM® AVALANCHE® and ESCALADE® EXT, include unusually tall endgates. For example, these vehicles may have a lift-over height, which is the height cargo must be lifted from the ground to clear the top of the cargo floor when the endgate is open, of approximately 34.5 inches. With the endgate in the horizontal, open position, the roach-over height, or length which one must reach to load cargo onto the cargo bed over the horizontal endgate, in these vehicles is approximately 27.5 inches. These dimensions are significantly greater than that found in most other vehicles on the market, such as standard pick-up trucks.

SUMMARY OF THE INVENTION

The present invention provides an economical solution for improved access to a cargo bed having an endgate. The invention provides a "tailgate in a tailgate" or "mini-gate" that provides a door which is integrated into the endgate to improve access to a smaller portion of the cargo bed. This door allows small amounts of long cargo to be loaded on the open door, and provides a pass-through opening through which a user may load cargo, such as grocery bags, into the cargo bed. It is particularly advantageous, for use in the above-mentioned GM vehicles because the cargo beds of such vehicles are suitable for use as a trunk since they are virtually waterproof. The "mini-gate" reduces reach-over by allowing cargo loading from the side of the opening rather than over the end.

More specifically, the invention provides a vehicle including a cargo bed having a floor, side walls and a rear end opening. An endgate is hinged at the rear end opening so that the endgate is pivotable between a vertical position covering the rear end opening and a horizontal position exposing the rear end opening for cargo loading and unloading. The endgate includes a pass-through opening formed therein and has a door integrally contained within the endgate. The door is pivotable with respect to the endgate between a closed position covering the pass-through opening and an open position to allow loading and unloading of cargo through the pass-through opening when the endgate is in the vertical position.

Preferably, an electrically actuated endgate latch is operatively connected between the endgate and side walls for selectively latching and unlatching the endgate. Also, an electrically actuated door latch is operatively connected between the door and endgate for selectively latching and unlatching the door. A rocker switch is positioned below an endgate pull cup for actuating the latches.

A relay circuit is operatively associated with the rocker switch and configured such that only the endgate or door may be unlatched at one time. A disabler switch is operatively connected with the electrically actuated latches to enable the latches when a corresponding vehicle transmission is in a parked condition, and to disable the latches when the transmission is not in the parked condition.

The endgate and door pivot about a common horizontal axis, and at least one torsional load assist spring is operatively connected between the endgate and the side walls to minimize operating efforts in lifting the endgate to the vertical position. The endgate includes an aluminum tube frame structure enclosed by inner and outer twin panels. Load assist straps are connected between the endgate and the side walls to support the endgate in the horizontal position.

The open door or mini-gate allows a small quantity of long cargo to be loaded through the opening, and also allows easier access to the cargo bed for storage of groceries and the like without having to reach over the top of the endgate.

The above objects, features, advantages, and other objects, features, and advantages of the present invention are readily apparent from the following detailed description of the best mode for carrying out the invention when taken in connection with the accompanying drawings.

DESCRIPTION OF THE PREFERRED EMBODIMENTS

Figure 1:
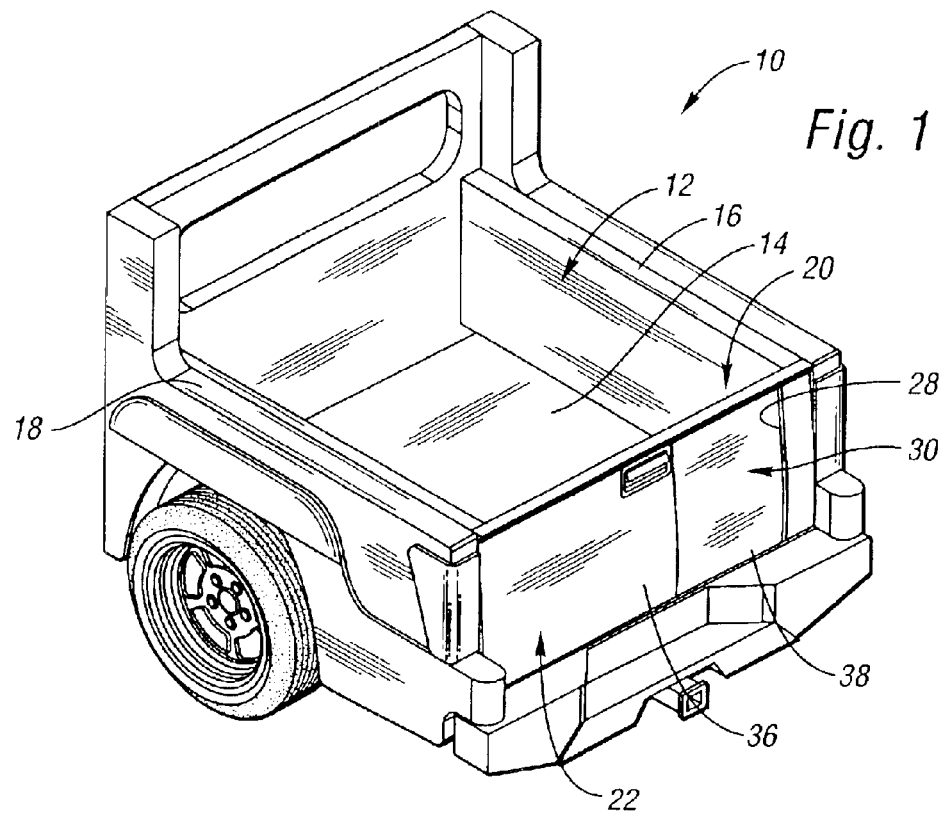
FIG. 1 shows a partial rear perspective view of a vehicle incorporating an endgate in accordance with the invention, with the endgate in the vertical, closed position.

FIG. 1 shows a partial perspective view of a vehicle 10 in accordance with the present invention which includes a cargo bed 12 having a floor 14, side walls 16, 18, and a rear end opening 20 which is covered by an endgate 22.

Figure 3:
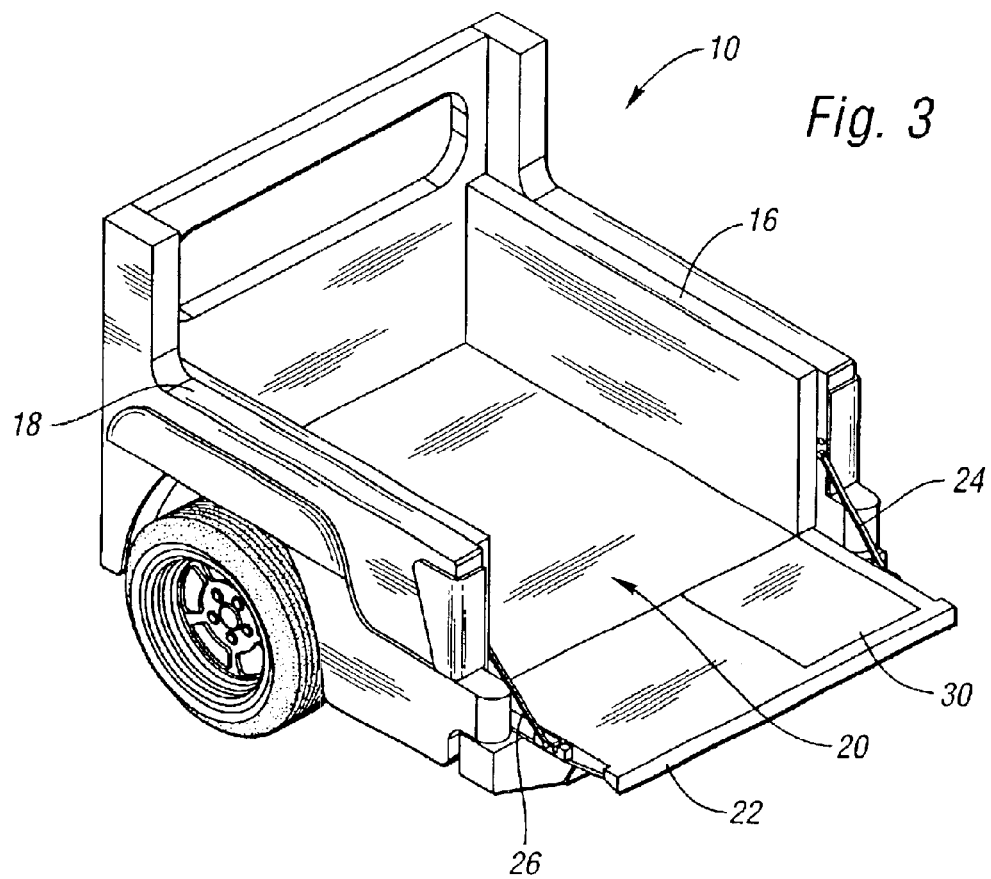
FIG. 3 shows a partial rear perspective view of the vehicle of FIG. 1 with the endgate in the horizontal, open position.

The endgate 22 is hinged to the body of the vehicle 10 adjacent the end of the vehicle floor 14 for pivotal movement between the vertical position shown in FIG. 1 covering the rear end opening 20, and the horizontal position shown in FIG. 3 exposing the rear end opening 20 for cargo loading and unloading. As shown in FIG. 3, assist straps 24, 26 extend between the side walls 16, 18 and the endgate 22 to prevent over-travel of the endgate 22 beyond the horizontal position illustrated.

Figure 2:
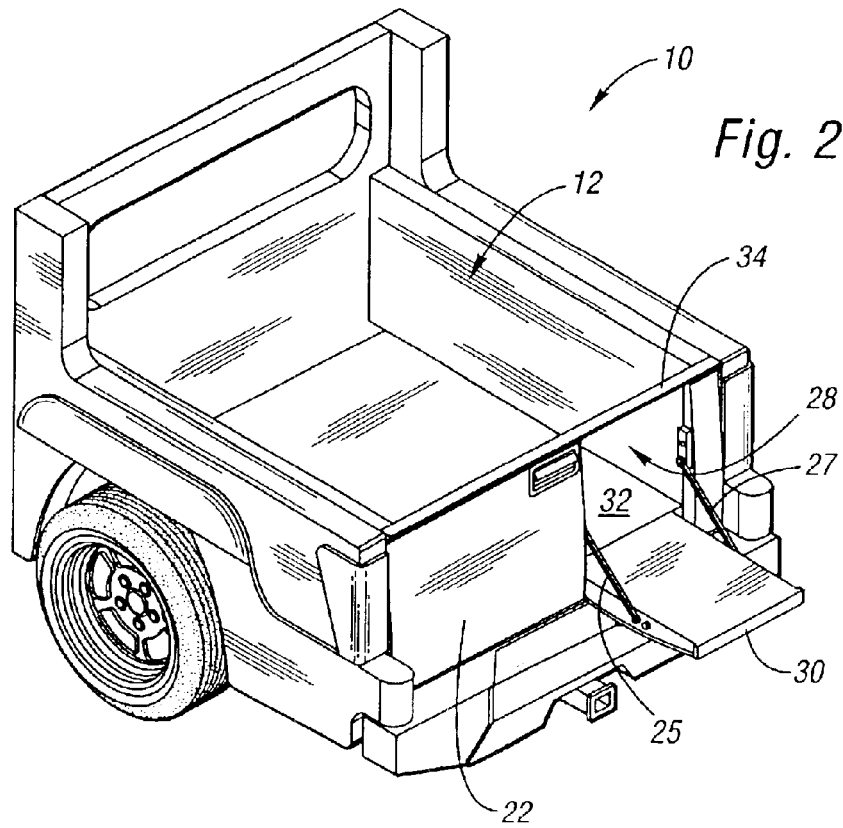
FIG. 2 shows a partial rear perspective view of the vehicle of FIG. 1 with the door (or mini-gate) in an open position.

As further shown in FIGS. 1–3, the endgate 22 has a pass-through opening 28, shown in FIG. 2, formed in the endgate 22. A door (or mini-gate) 30 is integrally contained within the endgate 22 and is pivotable with respect to the endgate 22 between a closed position covering the pass-through opening 28, as shown in FIG. 1, and an open position to allow loading and unloading of cargo through the pass-through opening when the endgate is in the vertical position, as shown in FIG. 2.

The horizontal position of the door 30 shown in FIG. 2 allows a small quantity of long cargo to be loaded through the open door 30. The door 30 also allows easier access to a small portion 32 of the cargo bed 12 for storage of groceries and the like without having to reach over the top 34 of the endgate 22. The door 30 is supported in its open position by assist straps 25, 27 to prevent overtravel.

Figure 4:
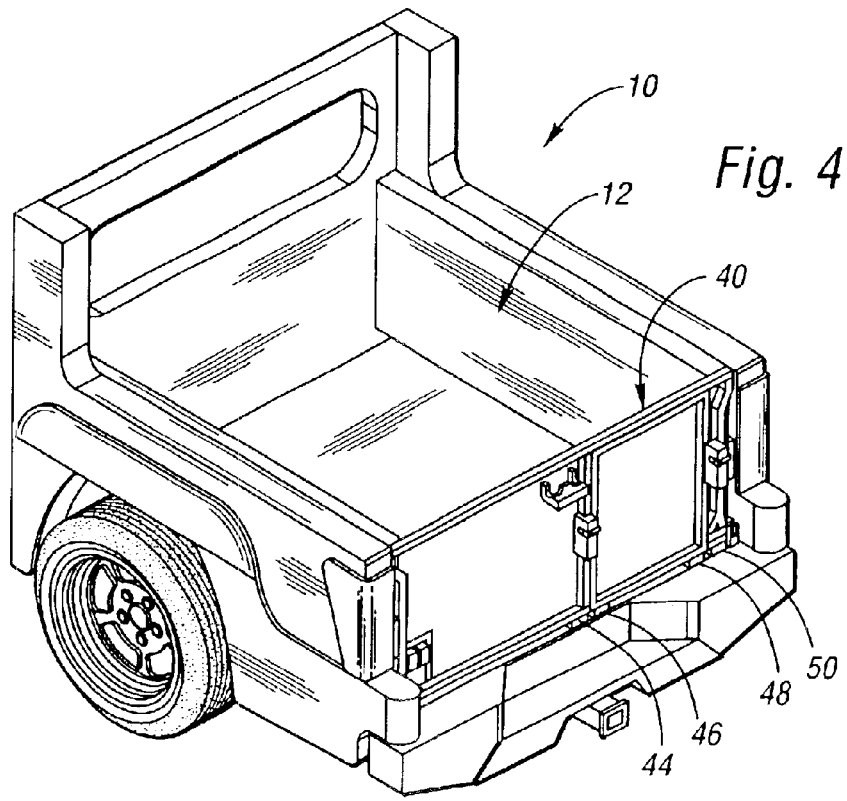
FIG. 4 shows a partial rear perspective view of the vehicle of FIG. 1 with the trim cover panels removed from the endgate.
Figure 5:
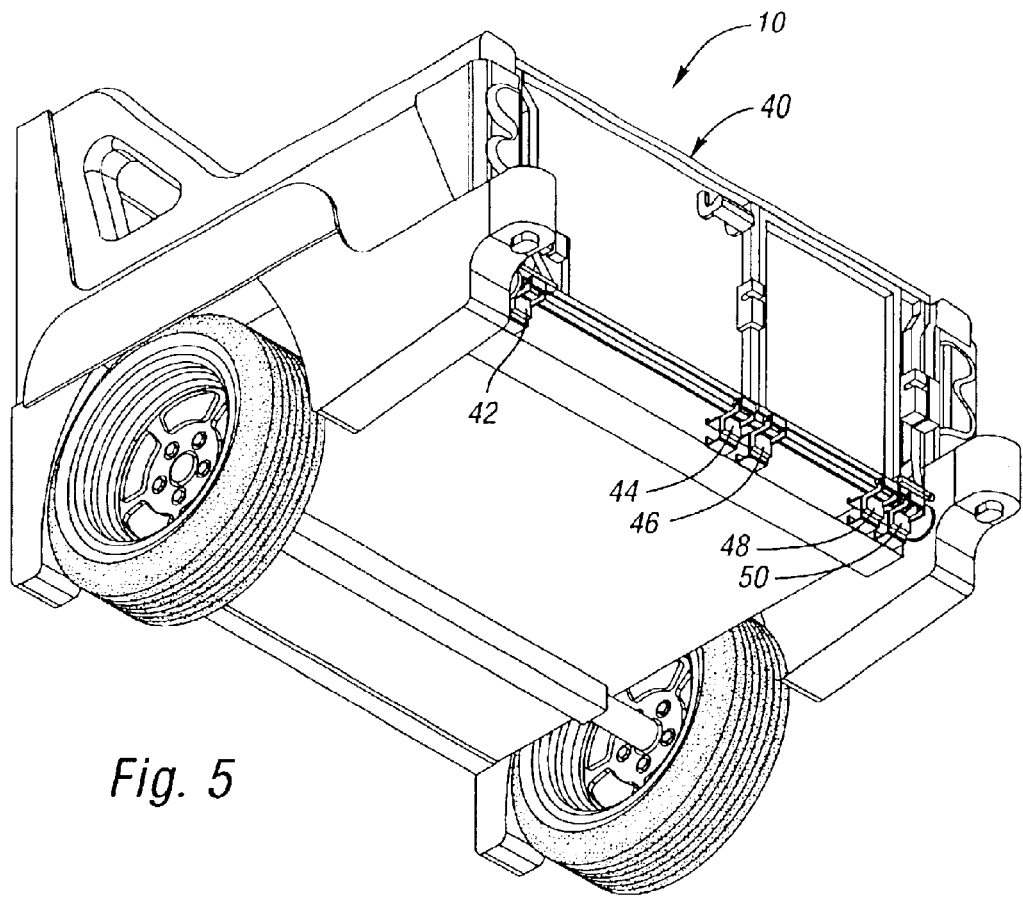
FIG. 5 shows an underside partial rear perspective view of the vehicle of FIG. 4.
Figure 6:
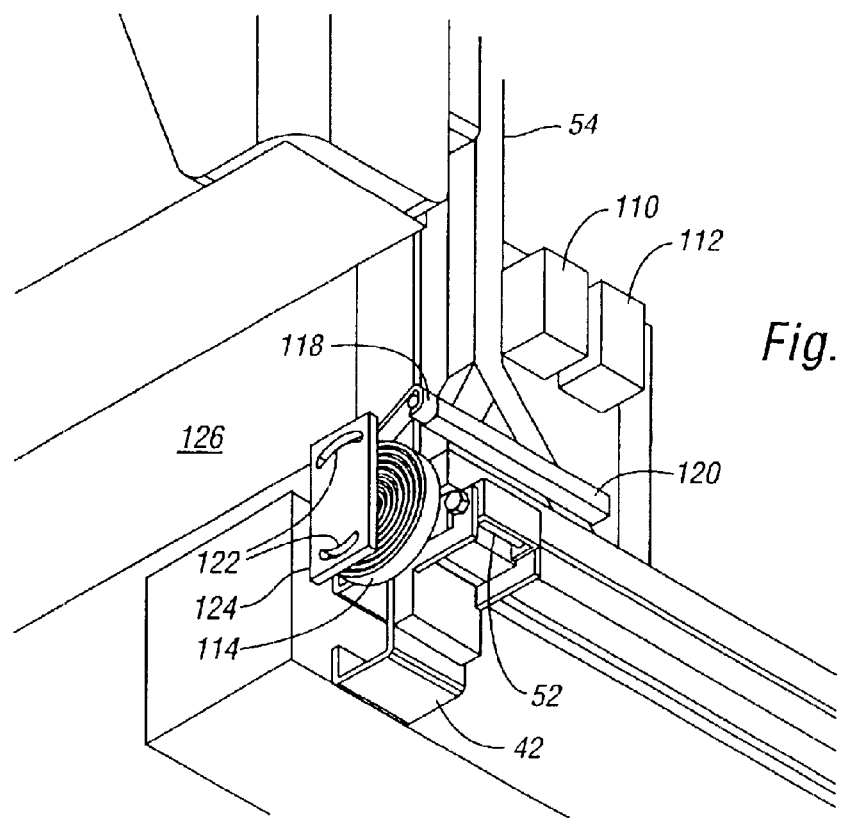
FIG. 6 shows a close-up perspective view of the lower left end of the endgate assembly as shown in FIG. 4.
Figure 7:
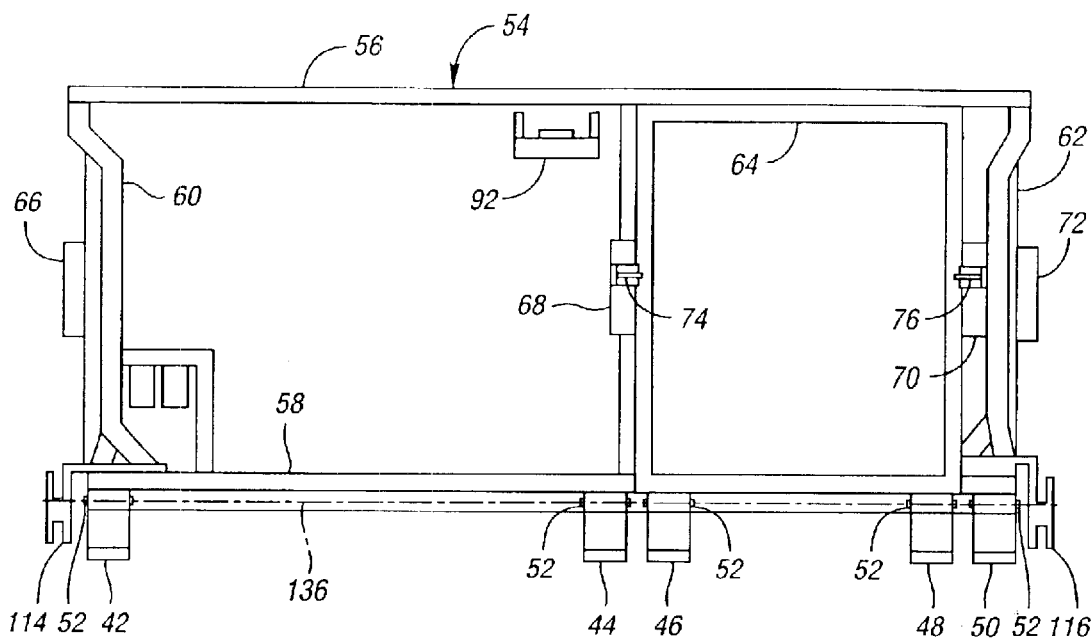
FIG. 7 shows a plan view of the endgate frame assembly shown in FIG. 4.
Figure 8:
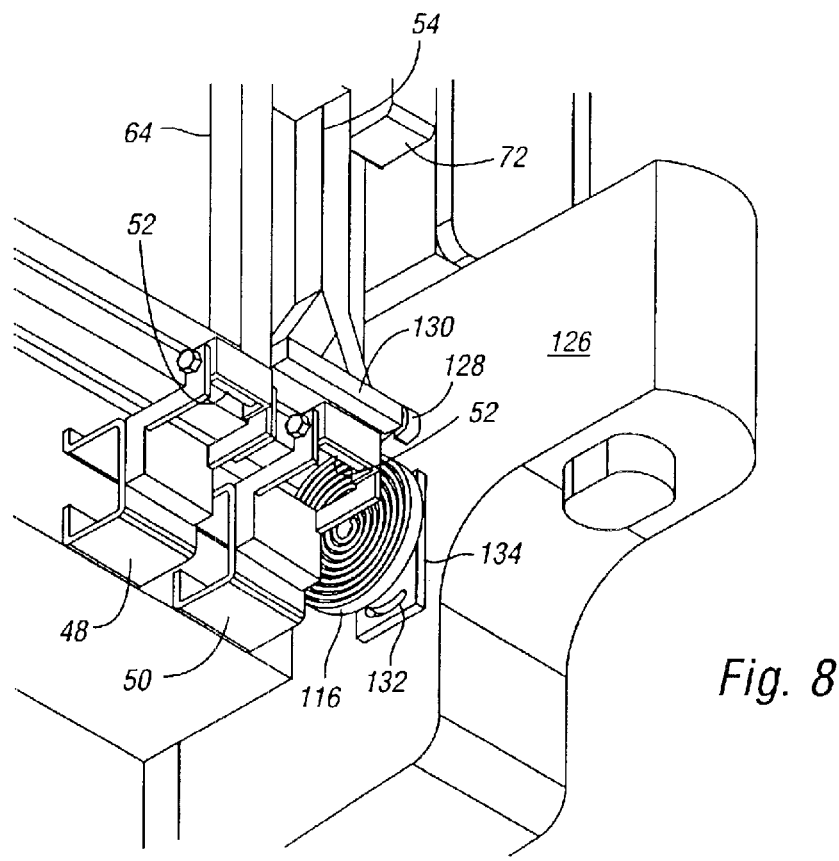
FIG. 8 shows a close-up perspective view of the lower right end of the endgate assembly shown in FIG. 4.

FIGS. 4 and 5 show the vehicle 10 of FIG. 1 with the trim cover panels 36, 38 removed so that the endgate frame assembly 40 is visible. The endgate frame assembly 40 is an aluminum tube structure which is pivotally connected to the vehicle body by the support brackets 42, 44, 46, 48, 50. Referring to FIGS. 6, 7, and 8, each of the support brackets 42, 44, 46, 48, 50 supports a respective pivot pin 52 which pivotally supports the frame 54 with respect to the support brackets 42, 44, 46, 48, 50. The frame 54 includes upper and lower transverse bars 56, 58, side bars 60, 62, and a door frame 64 contained therein. The frame 54 also includes latch housings 66, 68, 70, 72 which house pivotable latches operative to engage corresponding strikers. For example, the latch housing 66 contains a pivotable latch which is engageable with a striker pin on the side wall 18 of the cargo bed 12. The latch housing 72 contains a latch which is pivotally engageable with a striker pin on the side wall 16 of the cargo bed 12. The latch housings 68, 70 contain pivotable latches which are engageable with striker pins 74, 76 which are carried by the door frame 64. Preferably, the latches are those available from Keykert USA, Inc. of Webberville, Mich.

Figure 9:
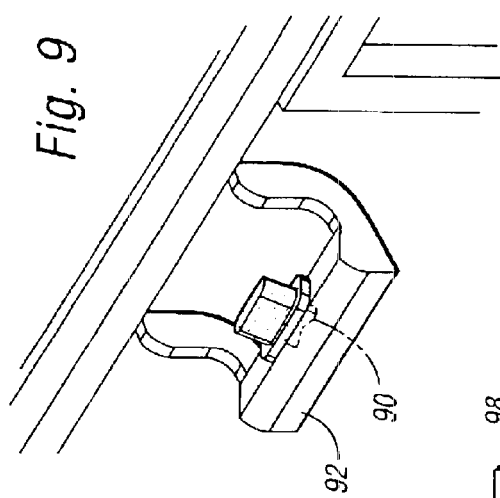
FIG. 9 shows a close-up perspective view of the endgate pull cup, rocker switch structure and endgate frame of FIG. 4.
Figure 10:
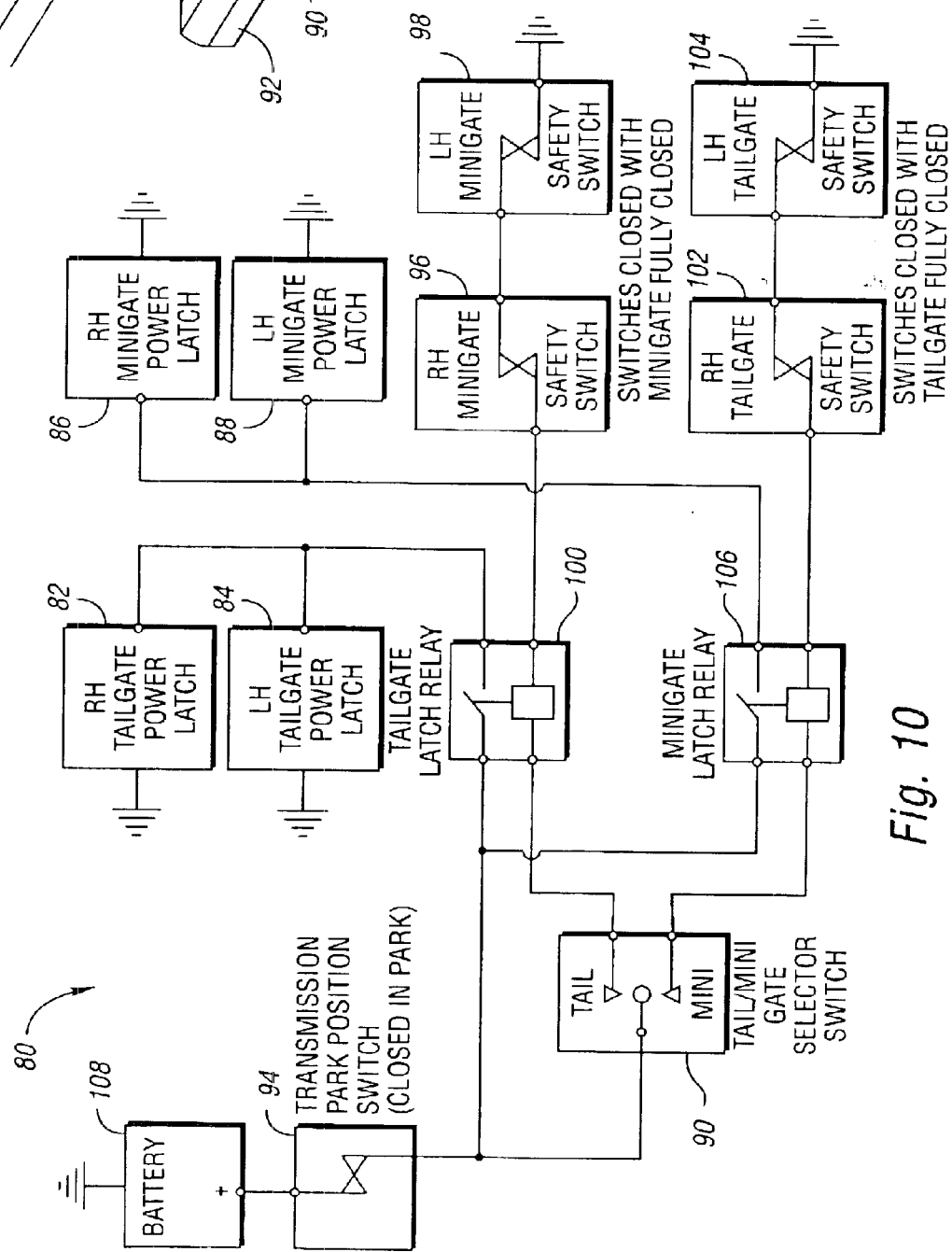
FIG. 10 shows a schematic illustration of a relay circuit for use with the endgate and door of the present invention.

The latches contained within the latch housings 66, 68, 70, 72 are electrically actuated for selectively latching and unlatching the endgate 22 and the door 30. The relay circuit associated with such latches is shown in FIG. 10. As shown, the relay circuit 80 provides the necessary signals to actuate the right hand endgate (or tailgate) power latch 82 (located inside housing 72), left hand endgate (or tailgate) power latch 84 (inside housing 66), right hand door (mini-gate) power latch 86 (inside housing 70), and left hand door power latch 88 (inside housing 68). These latches 82, 84, 86, 88 are actuated by a selector switch 90, which is also shown in FIG. 9 positioned under the endgate pull cup 92. The switch 90 is a toggle switch which selectively actuates (disengages) either the endgate latches 82, 84 or the door latches 86, 88.

The switch 90 is available from Magna Atoma Hardware & Door Systems of Aurora, Ontario under the part name "Switch ASM—Rear Window".

The relay circuit 80 has two protection devices so that the latches are only operated when desired. The first protection device is a transmission park position switch 94 which is closed only when the transmission is in park so that the latches may be disengaged only when the vehicle is in a parked condition. The second protection device is also illustrated in FIG. 10. The door (or mini-gate) safety switches 96, 98 and endgate (or tailgate) latch relay 100 assure that the endgate latches 82, 84 may only be disengaged when the door 30 is closed. Similarly, the endgate (or tailgate) safety switches 102, 104 and door (or mini-gate) latch relay 106 ensure that the door latches 86, 88 may only be disengaged when the endgate 22 is in the closed position.

Power for operating the latches 82, 84, 86, 88 is provided by the battery 108. A key fob can be used to lock and unlock the latches 82, 84, 86, 88.

Referring to FIG. 6, the endgate (or tailgate) latch relay 100 and door (or mini-gate) latch relay 106 shown in FIG. 10 are housed within the boxes 110, 112.

FIGS. 6, 7 and 8 also illustrate the clock, or torsional load assist springs 114, 116 which provide an assist force in closing the endgate 22. As shown in FIG. 6, the distal end 118 of the spring 114 is connected to the bar 120 on the frame 54 so that the torsional spring 114 is rotatably stretched when the endgate 22 is opened, and this stretching results in an assist force in closing the door. The assist force provided by the spring 114 may be adjusted by adjusting the rotational position of the spring 114 with respect to the slots 122 in the adjustment bracket 124, which is mounted to the vehicle body 126. Similarly, as shown in FIG. 8, the spring 116 has a distal end 128 which is connected to the bar 130 on the frame 54 to provide additional assist force in closing the endgate 22. Again, the spring 116 is attached to the body 126 and is rotatably adjustable by means of slots 132 on the adjustment bracket 134.

In a mockup version of the invention, the endgate lift effort was 20.7 lbs fully opened, as compared to 26.7 lbs fully opened without a clock spring in a stock Avalanche® endgate. The endgate closing effort was 5.3 lbs at approximately 6 inches opened, as compared to 6.1 lbs without a clock spring in the stock Avalanche® endgate.

As shown in FIG. 7, the endgate frame assembly 54 and door frame 64 pivot about a common pivot axis 136, which also intersects the center of the springs 114, 116.

While the best mode for carrying out the invention has been described in detail, those familiar with the art to which this invention relates will recognize various alternative designs and embodiments for practicing the invention within the scope of the appended claims.

What is claimed is:

1. A vehicle comprising:
   a cargo bed having a floor, two vertical side walls and a rear end opening;
   an endgate having a fixed hinge connected at the rear end opening along a lower horizontal edge so that the endgate is pivotable between a vertical position covering the rear end opening and a horizontal position exposing the rear end opening for cargo loading and unloading; and
   said endgate having a pass-through opening formed therein smaller than the rear end opening of the cargo bed and including a door integrally contained within said endgate and biased towards one of said side walls, said door being pivotable with respect to said endgate between a closed position covering said pass-through opening and an open position to allow loading and unloading of the cargo through the pass-through opening when the endgate is in the vertical position.

2. The vehicle of claim 1, further comprising an electrically actuated endgate latch operatively connected between the endgate and side walls for selectively latching and unlatching the endgate.

3. The vehicle of claim 2, further comprising an electrically actuated door latch operatively connected between the door and endgate for selectively latching and unlatching the door.

4. The vehicle of claim 3, further comprising a rocker switch positioned below an endgate pull cup for actuating said latches.

5. The vehicle of claim 1, wherein the endgate and door pivot about a common horizontal axis.

6. The vehicle of claim 1, wherein said endgate includes an aluminum tube frame structure enclosed by trim cover panels.

7. A vehicle comprising:
   a cargo bed having a floor, two vertical side walls and a rear end opening;

an endgate having a fixed hinge connected at the rear end opening Ualong a lower horizontal edge so that the endgate is pivotable between a vertical position covering the rear end opening and a horizontal position exposing the rear end opening for cargo loading and unloading;

said endgate having a pass-through opening formed therein and including a door integrally contained within said endgate and biased towards one of said side walls, said door being pivotable with respect to said endgate between a closed position covering said pass-through opening and an open position to allow loading and unloading of the cargo through the pass-through opening when the endgate is in the vertical position; and at least one torsional load assist spring operatively connected between said endgate and said side walls to minimize operating efforts.

8. The vehicle of claim 7, further comprising an electrically actuated endgate latch operatively connected between the endgate and side walls for selectively latching and unlatching the endgate.

9. The vehicle of claim 8, further comprising an electrically actuated door latch operatively connected between the door and endgate for selectively latching and unlatching the door.

10. The vehicle of claim 9, further comprising a disabler switch operatively connected with said electrically actuated latches to enable the latches when a corresponding vehicle transmission is in a parked condition, and to disable the latches when the transmission is not in the parked condition.

11. The vehicle of claim 7, wherein the endgate and door pivot about a common horizontal axis.

12. A vehicle comprising
a cargo bed having a floor, side walls and a rear end opening;
an endgate having a fixed hinge connected at the rear end opening so that the endgate is pivotable between a vertical position covering the rear end opening and a horizontal position exposing the rear end opening for cargo loading and unloading;
said endgate having a pass-through opening formed therein and including a door integrally contained within said endgate, said door being pivotable with respect to said endgate between a closed position covering said pass-through opening and an open position to allow loading and unloading of the cargo through the pass-through opening when the endgate is in the vertical position;
at least one torsional load assist spring operatively connected between said endgate and said side walls to minimize operating efforts;
an electrically actuated endgate latch operatively connected between the endgate and side walls for selectively latching and unlatching the endgate;
an electrically actuated door latch operatively connected between the door and endgate for selectively latching and unlatching the door; and
a rocker switch positioned below an endgate pull cup for actuating said latches.

13. The vehicle of claim 12, further comprising a relay circuit operatively associated with said rocker switch and configured such that only the endgate or door may be unlatched at one time.

14. The vehicle of claim 12, wherein said endgate includes an aluminum tube frame structure enclosed by trim cover panels.

15. The vehicle of claim 12, further comprising load assist straps connected between the endgate and side walls to support the endgate in the horizontal position.

16. A vehicle comprising:
a cargo bed having a floor, side walls, and a rear end opening;
an end gate having a fixed hinge connected at the rear end opening so that the endgate is pivotable between a vertical position covering the rear end opening and a horizontal position exposing the rear end opening for cargo loading and unloading;
said end gate having a pass-through opening formed therein and including a door integrally contained within said end gate, said door being pivotable with respect to said end gate between a closed position covering said pass-through opening and an open position to allow loading and unloading of the cargo through the pass-through opening when the end gate is in the vertical position;
an electrically actuated end gate latch operatively connected between the end gate and side walls for selectively latching and unlatching the end gate:
an electrically actuated door lath operatively connected between the door and end gate for selectively latching and unlatching the door;
a rocker switch positioned on the end gate for actuating said latches;
a relay circuit operatively associated with said rocker switch and configured such that only the end gate or door may be unlatched at one dine; and
a disabler switch operatively connected with said relay circuit to enable the latches when a corresponding vehicle transmission is in a parked condition, and, to disable the latches when the transmission is not in the parked condition.

17. A vehicle comprising:
a cargo bed having a floor, side walls and a rear end opening;
an endgate having a fixed hinge connected at the rear end opening so that the endgate is pivotable between a vertical position covering the rear end opening and a horizontal position exposing the rear end opening for cargo loading and unloading;
said endgate having a pass-through opening formed therein and including a door integrally contained within said endgate, said door being pivotable with respect to said endgate between a closed position covering said pass-through opening and an open position to allow loading and unloading of cargo through the pass-through opening when the endgate is in the vertical position;
an electrically actuated endgate latch operatively connected between the endgate and the side walls for selectively latching and unlatching the endgate;
an electrically actuated door latch operatively connected between the door and the endgate for selectively latching and unlatching the door; and
a rocker switch positioned below an endgate pull cup for actuating said latches.

18. The vehicle of claim 17, further comprising a relay circuit operatively associated with said rocker switch and configured such that only the endgate or door may be unlatched at one time.

19. The vehicle of claim 17, further comprising load assist straps connected between the endgate and side wails to support the endgate in the horizontal position.

* * * * *